United States Patent Office 2,892,626
Patented June 30, 1959

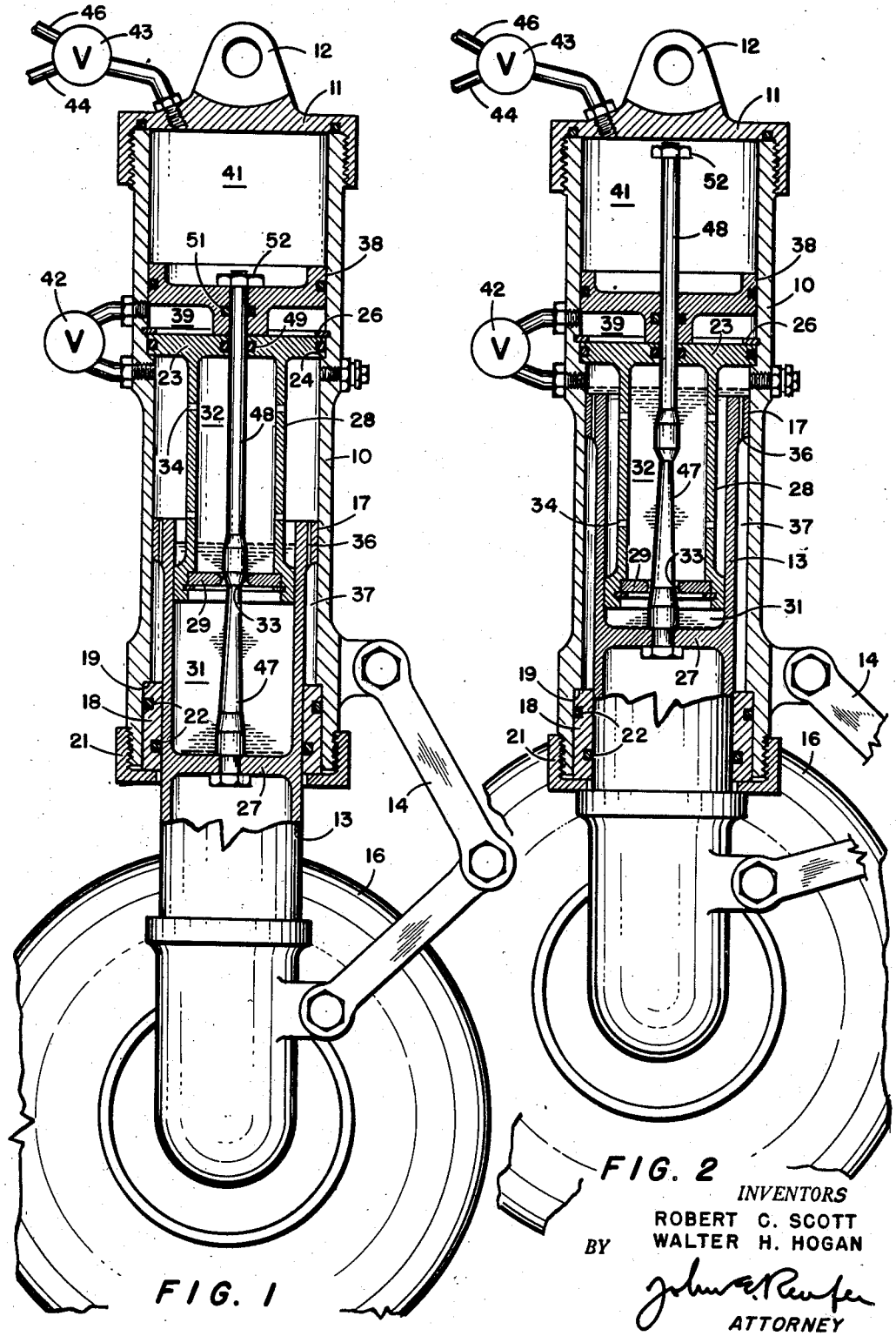

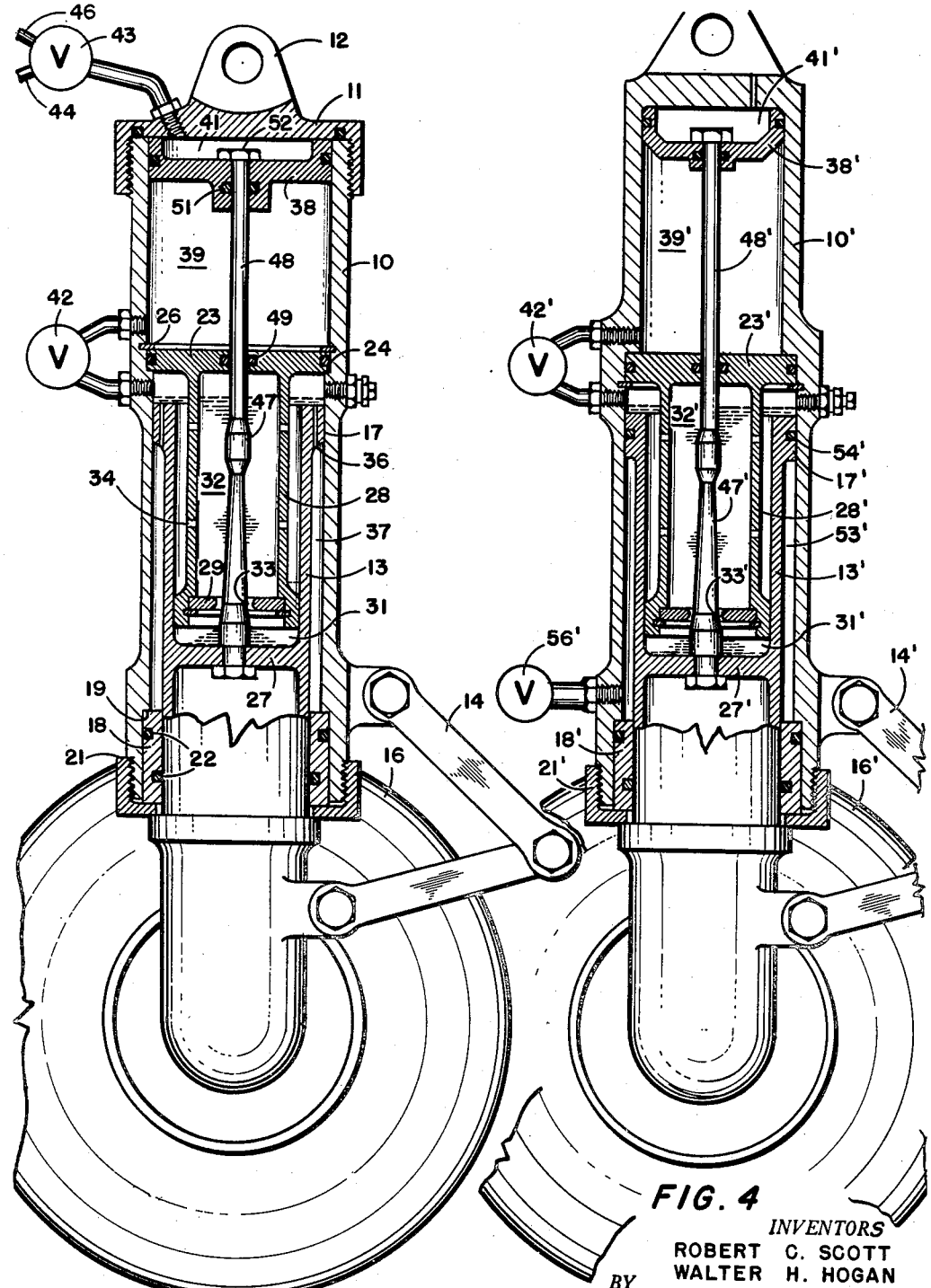

2,892,626

LANDING GEAR CONSTRUCTION

Robert C. Scott, Maple Heights, and Walter H. Hogan, Olmsted Falls, Ohio, assignors to Cleveland Pneumatic Industries, Inc., a corporation of Ohio Application August 17, 1955, Serial No. 528,991

15 Claims. (Cl. 267—64)

This invention relates generally to a landing gear and more particularly to a landing gear which may be compressed so that it may be stored in a small space in the aircraft upon retraction.

It is an important object of this invention to provide a landing gear incorporating an oleo mechanism which may be compressed to reduce the space necessary for storage of the gear upon retracton.

It is another important object of this invention to provide a landing gear wherein the pressurized fluid of the oleo is utilized to assist in compressing the gear so that it may be stored in a small area upon reaction.

It is still another object of this invention to provide a landing gear utilizing differential opposed areas which permit easy compression of the oleo mechanism.

It is still a further object of this invention to provide a landing gear having an area which may be subjected to the fluid under pressure in the oleo mechanism which area assists in compressing the landing gear.

Further objects and advantages will appear from the following description and drawings, wherein:

Figure 1 is a side elevation in longitudinal section of a landing gear according to this invention shown in the extended position;

Figure 2 is a view similar to Figure 1 showing the position of the elements when the landing gear is fully compressed by the weight of the aircraft;

Figure 3 is a longitudinal section showing the position of the elements when the landing gear is compressed for retraction; and, Figure 4 is a side elevation in longitudinal section of a modified form of this invention.

In many modern aircraft, it is highly desirable to be able to compress the landing gear either during the retraction thereof or prior to the retraction so that it may be stored in a small area within the air frame. This is particularly important in the modern military aircraft since space is at a premium due to the vast amount of equipment which must be carried by the ship. However, reduction of the size of the landing gear storage space is desirable in all aircraft installations since it simplifies the structure of the air frame itself and makes it possible to increase the strength of the components without increasing the weight.

For a clear understanding of the invention, reference should be made to Figures 1 to 3 wherein one preferred landing gear according to this invention is shown. The landing gear is provided with an upper telescoping member 10 closed at its upper end by a cap member 11 on which is formed a mounting trunnion 12 adapted to be fixed to an aircraft. A lower telescoping member 13 projects into the lower end of the upper telescoping member 10 and is capable of axial motion relative thereto. Torque arms 14 are pivotally connected to the upper telescoping member 10 and lower telescoping member 13 and prevent relative rotational motion while permitting relative axial motion between the members. A ground engaging wheel 16 is journaled at the lower end of the lower telescoping member 13. The lower telescoping member 13 is formed with an upper bearing portion 17 which engages the inner wall of the upper telescoping member 10 and a gland nut 18 is securely retained against a shoulder 19 formed in the upper telescoping member 10 by a flanged lock nut 21. Seals 22 prevent leakage of fluid between the gland nut 18 and the two telescoping members 10 and 13.

An oleo structure is provided within the strut to support the weight of the aircraft when it is on the ground and to absorb the impact shock during landings. The main oleo cavity is defined within the strut by an upper bulkhead 23 secured against the shoulder 24 formed in the upper telescoping member 10 by a snap ring 26 and an integral lower bulkhead 27 formed across the lower telescoping member 13. The upper bulkhead 23 is formed with an axially extending plunger tube 28 which extends into the upper end of the lower telescoping member 13. An orifice plate 29 mounted on the plunger tube 28 divides the main oleo cavity into a lower oleo chamber 31 below the orifice plate and the upper oleo chamber 32 above the orifice plate which chambers are in fluid communication through a central orifice 33 formed in the orifice plate 29. It should be understood that the upper oleo chamber 32 includes the area between the upper telescoping member 10 and the plunger tube 28 as well as the area within the plunger tube and that fluid communication is provided between these areas by a plurality of ports 34 formed in the plunger tube.

When the landing gear or strut is in the fully extended position shown in Figure 1, the lower oleo chamber 31 is filled with a liquid as is the lower portion of the upper oleo chamber 32. The remaining portions of the upper oleo chamber 32 are charged with air under pressure which pressure is of course transmitted to the liquid in the two chambers 31 and 32. The bearing portion 17 is formed with a plurality of small orifices 36 which provide fluid communication between the upper chamber 32 and a rebound chamber 37 around the lower telescoping member 13. The rebound chamber 37 is also filled with liquid and functions in the usual manner to control rebounds after landing. Those skilled in the art will recognize that the fluid under pressure within the oleo chambers 31 and 32 produce a reaction force on the lower telescoping member 13 which is a function of the pressure of the fluid times the area within the gland nut 18 and this force resiliently urges the lower telescoping member 13 downward relative to the upper telescoping member 10.

Above the upper bulkhead 23 is a compressing mechanism utilized to assist in the compression of the strut when it is desired to retract it into the aircraft. Positioned within the cavity above the upper bulkhead 23 and the cap member 11 is a slidable piston 38 which divides the cavity into a first chamber 39 and a second chamber 41. The first chamber 39 is connected to the upper oleo chamber 32 through a control valve 42. The control valve is a simple on/off valve which may be opened to provide fluid communication between the chambers 39 and 32 or closed to isolate the two chambers. An operating valve 43 connects the second chamber 41 to a source of fluid under pressure (not shown) by a pressure line 44 and to a reservoir return through a second pressure line 46.

Securely mounted on the lower bulkhead 27 is a metering pin 47 which projects through the orifice 33, the upper bulkhead 23 and the piston 38. The upper portion of the metering pin 48 which projects through the upper bulkhead 23 and piston 38 is formed with a uniform cross section and seals 49 and 51 mounted on the upper bulkhead 23 and piston 38 respectively prevent fluid leakage along the metering pin but permit the metering pin to move axially. The lower portions of the metering pin 47 which are within the orifice 33 during the operation of the strut are contoured to provide the desired resistance to flow through the orifice so that a proper load stroke curve will be developed to absorb the impact of landing. A nut fastener 52 is threaded onto the upper end of the metering pin 47 above the piston 38 and upon engagement therebetween limits relative axial movement in one direction. The various proportions are arranged so that when the landing gear is in the extended position shown in Figure 1 and the piston 38 is adjacent to the upper bulkhead 23, the nut 52 engages the upper side of the piston 38. This structure permits axial motion between the metering pin 47 and the piston 38 except when the nut 52 engages the piston at which time the metering pin 47 and piston 38 are restrained against relative axial motion in one direction.

In operation, assuming the landing gear is in the fully extended position, the valve 42 is closed isolating the first chamber 39 and the upper oleo chamber 32. At this time the pressure within the first chamber 39 is equal to the pressure within the upper oleo chamber 32 and the piston 38 is adjacent to the bulkhead 23. When the weight of the aircraft is applied to the strut during a landing, the lower telescoping member 13 moves upwardly relative to the upper telescoping member 10 causing a compression of the gas within the upper oleo chamber 32 until the reaction force on the lower telescoping member 13 equals the load carried by the strut. In Figure 2 the strut is shown under maximum compression from landing, however, it should be understood that normally the proportions will be arranged so that the strut will assume a static position between the positions shown in Figures 1 and 2 when the aircraft is on the ground. The fully compressed position is shown, however, to illustrate the extremes of operation. As the landing gear is compressed by a landing to the position shown in Figure 2, the metering pin 47 moves upwardly relative to the upper telescoping member 10 through the upper bulkhead 23 and piston 38. The piston 38 will not move upwardly relative to the upper telescoping member 10 since the first chamber 39 is isolated from the upper oleo chamber 32 by the valve 42. In some cases it may be desirable to thread the metering pin 47 into the piston 38 so that they are axially fixed relative to each other. If this is done the piston 38 will be pushed up by the metering pin during the landing causing a vacuum in the first chamber 39. In such cases the second chamber 41 may be vented so that the pressure therein will not build up thereby limiting the force on the piston 38 which must be carried by the metering pin. It should be noted that this force assists in supporting the aircraft.

The compression of the strut for retraction may be accomplished easily. In the embodiment shown in Figures 1 through 3 the effective area of the piston 38 is larger than the effective area of the lower telescoping member 13, so if the pressure within the first chamber 39 is equal to the pressure within the upper oleo chamber 32 and fluid communication is provided therebetween to maintain the pressures equal, the reaction force on the piston 38 in the upward direction will be greater than the reaction force on the lower telescoping member 13 in the downward direction. Therefore, compression of the strut for retraction (see Figure 3,) is accomplished by merely opening the control valve 42 to provide fluid communication between the first chamber 39 and the upper oleo chamber 32 and venting the second chamber 41 by moving the operating valve 43 to the position wherein it is connected to the reservoir return line 46. When the first chamber 39 is in communication with the upper oleo chamber 32, the piston 38 will move upwardly relative to the upper telescoping member 10. Because such motion is opposed by the nut 52, the reaction force on the piston 38 is transmitted to the metering pin and in turn to the lower telescoping member 13. Since the reaction force on the piston 38 is greater than the reaction force on the lower telescoping member 13 and in an opposite direction, the piston 38 and the lower telescoping member 13 will move upwardly as soon as the control valve 42 is opened and the second chamber 41 is vented. Therefore, the landing gear is automatically moved to the compressed position without requiring an outside source of power.

To extend the gear after it has been compressed for retraction, it is merely necessary to change the valve 43 to the position wherein the second chamber 41 is in fluid communication with a source of fluid under pressure through the pressure line 44. The fluid within the second chamber 41, of course, produces a reaction force on the piston 38 in downward direction and tends to neutralize the pressure within the first chamber 39. Therefore, as soon as the pressure within the second chamber builds up to a value large enough to produce a reaction force sufficient to overcome the differential between the upward reaction force on the piston 38 and the downward reaction force on the lower telescoping member 13 as well as to overcome the friction of the bearings, the elements will move to the fully extended position. It should be understood that if the differential area between the piston 38 and the lower telescoping member 13 is properly proportioned, a very low pressure within the second chamber 41 will operate to extend the strut and that the pressure within the second chamber 41 need not be as great as the pressure within the other chambers. As soon as the landing gear is in the fully extended position, the control valve 42 is closed and the strut is ready for another landing.

In the embodiment of this invention shown in Figure 4, the operation is quite similar, however, the proportions are changed somewhat. The various referenced numerals designating the various elements of this embodiment are the same as the referenced numerals designating the elements in the embodiment shown in Figures 1 through 3, however, a prime has been added in this case. In this embodiment the effective area of the piston 38' is less than the effective area of the lower telescoping number 13', therefore, when the control valve 42' is opened the strut will assume the extended position because the reaction force on the lower telescoping number 13' is greater than the reaction force on the piston 38'. In this embodiment the second chamber 41 is permanently vented to atmosphere to prevent a build up of pressure or vacuum therein and an actuating chamber 53', defined between the gland nut 18'' and the bearing portion 17', is utilized to compress the gear. Of course, the actuating chamber 53' is isolated from the upper and lower chambers 32' and 31'. In this case a seal 54' is mounted on the bearing portion 17' to prevent leakage between the actuating chamber 53' and the upper chamber 32'.

The actuating chamber 53' is adapted to be connected to a source of fluid under pressure through an operating valve 56'. Prior to the landing of the aircraft when the strut is in the extended position, the control valve 42' is closed and the upper oleo chamber 32' is isolated from the chamber 39'; therefore, the piston 38' will not move upwardly with the lower telescoping member 13' when a landing occurs. In this embodiment compression of the strut for retraction is accomplished by opening the control valve 42' and supplying fluid under pressure to the actuating chamber 53' through the operating valve 56'. The reaction force on the piston 38' is less than the reaction force of the fluid within the chamber 32' so it is necessary to provide an additional upward force to compress the gear. This additional force is supplied by the fluid under pressure within the actuating chamber 53' acting on the bearing portion 17'. Here again the force necessary to operate the strut is only that force necessary to overcome the differential between the force on the piston 38' and the reaction force on the lower telescoping member 13' created by the fluid within the chamber 32' plus a sufficient force to overcome friction. In this embodiment it is not necessary to supply fluid under pressure in order to extend the gear, but it is merely necessary to exhaust the fluid within the actuating chamber 53' and connect the upper chamber 32' with the first chamber 39'.

Those skilled in the art will recognize that a landing gear incorporating this invention may be fully compressed without providing elaborate equipment to develop large compression forces and that the strut tends to operate itself; therefore, a simple mechanism which is light in weight may be utilized without substantially increasing the manufacturing cost or maintenance problems.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A landing gear comprising first and second cooperating telescoping members, means in each of said members cooperating to define a pressure fluid filled cavity the volume of which is changed by relative axial motion between said members, a fluid actuated piston movable relative to said members, valve means connecting said cavity and one side of said piston for maintaining the fluid pressure on said one side of said piston equal to the fluid pressure in said cavity and operable to isolate said piston and said cavity, said pressure fluid producing a first reaction force on said second member urging it axially away from said first member and a second reaction force on said piston tending to move it relative to said members, and means connecting said piston and second member whereby said second reaction force opposes said first reaction force and assists in moving said second member axially toward said first member.

2. A landing gear comprising first and second cooperating telescoping members, a bulkhead in each of said members cooperating to define a pressure fluid filled cavity the volume of which is changed by relative axial motion between said members, a fluid actuated piston movable relative to said members, valve means connecting said cavity and one side of said piston for maintaining the fluid pressure on said one side of said piston equal to the fluid pressure in said cavity and operable to isolate said piston and said cavity, said pressure fluid producing a first reaction force on said second member urging it axially away from said first member and a second reaction force on said piston greater than said first reaction force tending to move it relative to said members, and means connecting said piston and second member adapted to transmit said second reaction force to said second member whereby said second reaction force opposes said first reaction force and moves said second member axially toward said first member when said valve means connects said cavity and piston.

3. A landing gear comprising first and second cooperating telescoping members, a bulkhead in each of said members cooperating to define a pressure fluid filled cavity the volume of which is changed by relative axial motion between said members, a fluid actuated piston movable relative to said members, valve means connecting said cavity and one side of said piston for maintaining the fluid pressure on said one side of said piston equal to the fluid pressure in said cavity and operable to isolate said piston and said cavity, said fluid under pressure producing a first reaction force on said second member urging it axially away from said first member and a second reaction force on said piston larger than said first reaction force tending to move it relative to said members, means connecting said piston and second member adapted to transmit said second reaction force to said second member whereby said second reaction force opposes said first reaction force and moves said second member axially toward said first member when said valve means connects said cavity and piston, and means to assist said first reaction force and move said second member away from said first member.

4. A landing gear comprising first and second cooperating telescoping members capable of relative axial motion, a bulkhead in each of said members cooperating to define a pressure fluid filled cavity the volume of which is changed by relative axial motion between said members, a fluid actuated piston movable relative to said members, valve means connecting said cavity and one side of said piston for maintaining the fluid pressure on said one side of said piston equal to the fluid pressure in said cavity operable to isolate said piston and said cavity, said pressure fluid producing a first reaction force on said second member urging it axially away from said first member and a second reaction force on said piston smaller than said first reaction force tending to move it relative to said members, connecting means between said piston and second member limiting movement of said piston relative to second member whereby said second reaction force opposes said first reaction force and tends to move said second member axially toward said first member when said valve means connects said cavity and piston, and means to assist said piston in moving said second member toward said first member.

5. A landing gear comprising first and second cooperating telescoping members capable of relative axial motion between a fully extended position and a fully compressed position, a bulkhead in each of said members cooperating to define a pressure fluid filled cavity the volume of which is changed by relative axial motion between said members, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, connecting means between said second member and said piston providing mutually engageable stop surfaces limiting axial motion of said piston relative to said second member in a direction away from said second member upon such engagement, said connecting means being proportioned to cause engagement between said stop surfaces when said members are in said fully extended position and said piston is substantially adjacent to said first member bulkhead.

6. A landing gear comprising first and second cooperating telescoping members capable of relative axial motion between a fully extended position and a fully compressed position, a bulkhead in each of said members cooperating to define a pressure fluid filled cavity the volume of which is changed by relative axial motion between said members, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, connecting means between said second member and said piston providing mutually engageable stop surfaces limiting axial motion of said piston relative to said second member in only a direction away from said second member upon such engagement, and means adapted to urge said piston in a direction toward said second member.

7. A landing gear comprising first and second cooperating telescoping members capable of relative axial motion between a fully extended position and a fully compressed position, a bulkhead in each of said members cooperating to define a pressure fluid filled cavity the volume of which is changed by relative axial motion between said members, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, connecting means between said second member and said piston providing mutually engageable stop surfaces limiting axial motion of said piston relative to said second member in only a direction away from said second member upon such engagement, and means for introducing fluid under pressure on the side of said piston opposite said chamber to urge it toward said second member.

8. A landing gear comprising first and second cooperating telescoping members capable of relative axial motion, a bulkhead in each of said members cooperating to define a pressure fluid filled cavity the volume of which is changed by relative axial motion between said members, said pressure fluid producing a reaction force on the effective area of said second member urging it axially away from said first member, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, the effective area of said piston exposed to fluid in said chamber being different than the effective area of said second member, connecting means between said second member and said piston limiting axial motion of said piston relative to said second member upon such engagement.

9. A landing gear comprising first and second cooperating telescoping members capable of relative axial motion, a bulkhead in each of said members cooperating to define a pressure fluid filled cavity the volume of which is changed by relative axial motion between said members, said pressure fluid producing a reaction force on the effective area of said second member urging it axially away from said first member, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, the effective area of said piston exposed to fluid in said chamber being different than the effective area of said second member, connecting means between said second member and said piston providing mutually engageable stop surfaces limiting axial motion of said piston relative to said member upon such engagement, said connecting means being proportioned to cause engagement between said stop surfaces when said members are in said fully extended position and said piston is substantially adjacent to said first member bulkhead.

10. A landing gear comprising first and second cooperating telescoping members capable of relative axial motion, a bulkhead in each of said members cooperating to define a pressure fluid filled cavity the volume of which is changed by relative axial motion between said members, said pressure fluid producing a reaction force on the effective area of said second member urging it axially away from said first member, a piston slidable in said first member on the side of said first member bulkhead remote from said cavity, said piston and first member bulkhead cooperating to define a fluid chamber the volume of which is changed by axial motion of said piston, valve means connecting said chamber and cavity adapted to isolate them and operable to provide fluid communication therebetween, the effective area of said piston exposed to fluid in said chamber being larger than the effective area of said second member, connecting means between said second member and said piston limiting axial motion of said piston relative to said second member upon such engagement whereby said piston overcomes second member reaction force and moves said second member toward said first member when said valve means connects said chamber and cavity.

11. A landing gear comprising first and second cooperating telescoping members, means on each of said members co-operating to define a pressure fluid filled cavity the volume of which is changed by relative motion between said members, a fluid actuated piston movable relative to said first member, valved means connecting said cavity and one side of said piston maintaining the fluid pressure on said one side of said piston equal to the fluid pressure in said cavity and operable to isolate said piston and said cavity, said pressure fluid producing a first reaction force on said second member urging it axially away from said first member and a second reaction force on said piston tending to move it relative to said first member, and means connecting said piston and second member transmitting said second reaction force to said second member in opposition to said first reaction force, the difference between said reaction forces being less than said first reaction force.

12. A landing gear comprising a pair of telescoping members cooperating to define a cavity filled with pressure fluid the volume of which is reduced by telescoping movement of said members toward each other, an element extending through said cavity mounted on one of said members provided with a piston engaging the other of said members, said piston defining part of a chamber isolated from said cavity the volume of which is increased by said telescoping movement, valved means connecting said cavity and chamber normally maintains the pressure in said chamber equal to the pressure in said cavity and operable to isolate said chamber from said cavity, the pressure fluid in said cavity producing a reaction force urging said members apart and the pressure fluid in said chamber producing a reaction force urging said members toward each other.

13. A landing gear comprising a pair of telescoping members, a cavity filled with pressure fluid in said members, said cavity including a first surface on one of said members acted upon by said pressure fluid producing a first reaction force urging said members axially apart, a second surface adapted to be exposed to said pressure fluid which produces a second reaction force thereon in a direction opposite said first reaction force, said second surface being normally isolated from said cavity and connected to said one member, valved means operable to provide fluid communication between said second surface and said cavity equalizing the pressure of the fluid acting on both of said surfaces.

14. A landing gear comprising a pair of telescoping members capable of relative movement between extended and compressed positions, a cavity filled with pressure fluid in said members, said cavity including a first surface on one of said members acted upon by said pressure fluid producing a first reaction force urging said members toward said extended position, a second surface adapted to be exposed to said pressure fluid which produce a second reaction force thereon in a direction opposite said first reaction force, said second surface being normally isolated from said cavity and connected to said one member, valved means operable to provide fluid communication between said second surface and said cavity equalizing the pressure of the fluid acting on both of said surfaces, said second reaction force urging said members toward said compressed position.

15. A landing gear comprising a pair of telescoping members, a cavity filled with pressure fluid in said members, said cavity including a first surface on one of said members acted upon by said pressure fluid producing a first reaction force urging said members axially apart, a second surface adapted to be exposed to said pressure fluid which produce a second reaction force thereon in a direction opposite said first reaction force, said second surface being normally isolated from said cavity and connected to said one member, the effective area of said first surface being different from the effective area of said second surface, valved means operable to provide fluid communication between said second surface and said cavity equalizing the pressure of the fluid acting on both of said surfaces.

References Cited in the file of this patent

UNITED STATES PATENTS

| | | |
|---|---|---|
| 2,554,581 | Levy | May 29, 1951 |
| 2,559,967 | Katz | July 10, 1951 |
| 2,679,827 | Perdue | June 1, 1954 |